United States Patent [19]

Matthews

[11] Patent Number: 4,541,056
[45] Date of Patent: Sep. 10, 1985

[54] INSTRUCTION SYSTEM TOPIC-INTERPRETING METHOD

[75] Inventor: Paul G. Matthews, Somerset, N.J.

[73] Assignee: AT&T Bell Laboratories, Murray Hill, N.J.

[21] Appl. No.: 513,367

[22] Filed: Jul. 13, 1983

[51] Int. Cl.³ .............................................. G06F 1/00
[52] U.S. Cl. ................................................... 364/300
[58] Field of Search ........ 364/200, 300, 900 MS File; 434/156, 307, 365

[56] References Cited

U.S. PATENT DOCUMENTS

| | | | |
|---|---|---|---|
| 3,566,482 | 10/1968 | Morchand ................................. | 35/9 |
| 3,606,688 | 7/1969 | Zawels et al. ......................... | 35/9 R |
| 4,109,938 | 8/1978 | Mitchell et al. ................. | 434/365 X |

OTHER PUBLICATIONS

Proceedings of the Seventh Annual Princeton Conference on Information Sciences and Systems, Mar. 22-23, 1973, "TICS: A System for the Authoring and Delivery of Interactive Instructional Programs," Kaplow et al., pp. 384-388.

Primary Examiner—Raulfe B. Zache
Attorney, Agent, or Firm—Charles Scott Phelan

[57] ABSTRACT

A topic announcement routine is provided and is called by an announce flag included in a flag field of an author-selected topic title definition in a course material database. Each call of such a flagged topic causes the routine to display for a student an announcement that a new topic is about to begin, and to make available to the student an opportunity to select a command from a predetermined set of commands including at least one address-generic transfer command. Control flags, such as an announce flag or the presence of text in the title field of a topic definition, are employed for various purposes, such as marking the end of transfer under a transfer command for that topic, or disabling selected commands of the set.

19 Claims, 13 Drawing Figures

TOPIC NODE (PRODUCTION NODE)

(EVENT NODE)

INSTRUCTION SYSTEM TOPIC-INTERPRETING METHOD

This invention relates to a computer-based system topic-interpreting method, and it relates more particularly to an arrangement for controlling student transfers among topics in instructional material.

BACKGROUND OF THE INVENTION

Electronic delivery of instructional material has been done in many ways. For example, a U.S. Pat. No. 3,566,482 to C. A. Morchand and another U.S. Pat. No. 3,606,688 to J. Zawels et al. shown television broadcast techniques for distributing instructional material to students at widely dispersed television-type receivers. The essentially unilateral communication involved in such systems requires that course delivery proceed in a predetermined sequence with no opportunity for a student to alter the delivery pace or to branch to arbitrarily selected points in a course. p In a paper by R. Kaplow et al. entitled "TICS: A System for the Authoring and Delivery of Interactive Instructional Programs," which appeared on pages 384–388 of *Proceedings, Seventh Annual Princeton Conference on Information Sciences and Systems,* which conference took place March 22–23, 1973, a computer-assisted instruction delivery system gave a student some leeway in branching out and setting an appropriate pace in proceeding through a course by having at the disposal of the student certain global commands. These commands were usable at any time and allowed, for example, the repetition of a current topic or the branching to certain course nodes specifically identified by the teacher in the course material in terms of a set of keywords which were unique to the branching points. It has been found, however, that most students who are new to the subject matter of a course, or to a computer-assisted instructional system, are relatively passive and rarely take advantage of the opportunity to utilize such global flexibility offered to them without substantial guidance.

SUMMARY OF THE INVENTION

The present invention mitigates the foregoing problems of flexibility in student transfer throughout course material in a computer-assisted instruction system by exercising control of student transfer action options. The options are presented to the student by means of a callable announce routine for displaying to a student an announcement both that a new topic in the regular course sequence is about to begin, and that the student has an opportunity to select one command among a predetermined set of commands, including at least one address-generic transfer command. Contents of the command set can be modified by course-author-placed binary control flags. The commands of the set are available to a student at only such announcement points.

An announce flag is placed in memory at author-selectable locations in a course delivery program so that each time a program statement at any such location is called, the aforementioned routine is executed to present the display to the student in a fashion which is common, at least in part, to all such announcements. Additional material can be contained in the announcement, but it is of a character which is computed by the system and added to the display so that specific detailed coding, or keyword specifications, which are unique to each node in a tutorial, need not be devised and coded by a course author.

BRIEF DESCRIPTION OF THE DRAWING

A more complete understanding of the invention and the various features, objects, and advantages thereof may be obtained from a consideration of the following detailed description in connection with the appended claims and the attached drawing in which:

DETAILED DESCRIPTION

Figure 1:
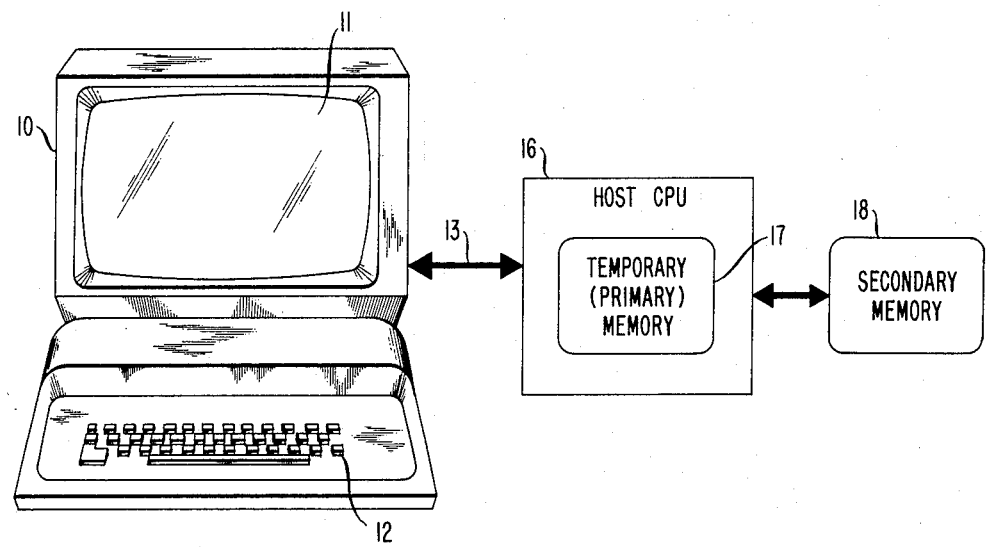
FIG. 1 illustrates a hardware system for running computer assisted instruction (CAI) systems employing the invention.

FIG. 1 illustrates one typical hardware configuration utilized in the art for operating computer-assisted instruction systems. A user terminal 10, such as the Hewlett-Packard HP 2645 terminal, includes a cathode ray tube display or screen 11, and an ASCII keyboard 12. Terminal 10 is coupled by way of a cable 13 to be operated in conjunction with a host central processing unit, such as, for example, a VAX-11/780 computer 16 manufactured by Digital Equipment Corp. This computer, as usual, includes a temporary memory 17. Memory 17, herein sometimes called primary memory, contains a stack for course topic definitions, to be described, for representing portions of a course, or tutorial, which is currently being executed. Memory 17 is provided in addition to other memory capabilities (not shown), such as the program memory, which are included in the host CPU 16. Also coupled to the CPU is a secondary memory 18, such as any suitable disk system for providing bulk storage of the course materials database. That database includes digital representations of the textual and graphical materials included in a course to be delivered in accordance with a course delivery program in the host CPU 16. Such a course delivery program advantageously runs on the UNIX TM operating system, e.g., the UNIX System V, which has been made available by American Telephone and Telegraph Company for licensing to the public. A description of a UNIX operating system is found in a collection of papers comprising Vol. 57, No. 6, Part 2, of the July-August 1978, edition of the *Bell System Technical Journal.*

Courseware for a subject is typically divided into topics that can be divided again into subtopics and so on. This results in a hierarchically organized outline or table of contents. In software terms, a topic is a procedure; a topic may call another topic, which returns to the calling topic when done; and such call-and-return relations define a topic "tree."

As used in an instruction delivery context herein, the term "topic" has a somewhat broader meaning than is usually attributed to that term in the context of a body of textual material. Thus, a topic is here a procedure, sometimes called a "topic procedure," which includes at least two parts to be further discussed herein. One part includes several types of control flags of binary character in which the presence of a bit, a character, or a group of characters, has a first operational significance; and the absence thereof has a second operational significance. Another part of a topic procedure includes at least two types of executable elements. One type of executable element is an ultimate topic, or "twig," directing the performance of some function, such as the display on the screen 11, of a specified segment of test or graphics for consideration by a student. Another type of executable element is a production list, including one or more condition-action pairs, or "productions," each directing the performance of a stated action if a stated condition is satisfied, or if no condition is stated. Production actions are often topic calls which have the effect of administering a memory stack of hierarchically-related, or nested, topics, e.g., call the topic definition for "Radio Specifications" to the stack. Other actions, which result in removal of a topic from the stack, are called return actions, e.g., remove the current topic from the stack and return to the topic from which it was called. Still other actions, that are neither topic calls nor return actions, serve miscellaneous functions, such as setting values of variables of either a numerical type, e.g, set X equal to 1, or a functional type, e.g., set the contents of a memory location called "choice" to the one of plural displayed words selected by a student. Actions in condition-action pairs may also be a subset of the twig-type of executable elements.

Figure 2:
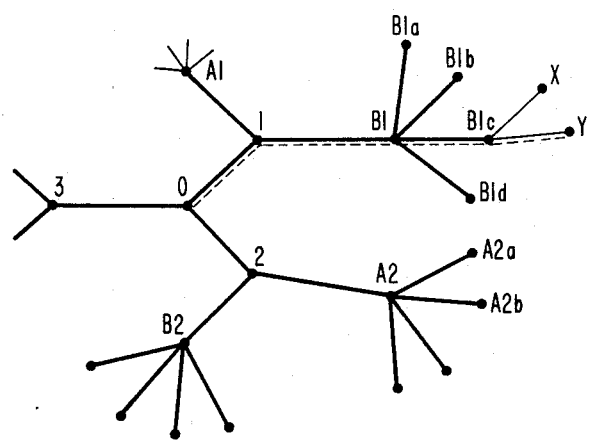
FIG. 2 illustrates a node tree depicting a hierarchical organization that can be used for tutorial material in a course delivered in the system of FIG. 1.

FIG. 2 depicts a topic tree for illustrating the concept of a regular course delivery sequence for hierarchically related topics. The actual mechanism for using the memory stack will be further considered in connection with FIGS. 3–5. The tree is drawn with the root topic node at the center of a circle, and the ultimate topic nodes arranged along the circumference. Nodes in the interior of the circle cluster topics into meaningful groups. A student typically begins at the center and moves toward the periphery for specific topics. The order of topic execution, i.e., in the regular order of course delivery, tends to be clockwise; and the student sweeps through the courseware as the hand of a clock. The concept of a regular course delivery sequence, or order, is an approximation which assumes that all parts of the course are considered by the student in the same sequence contemplated by the author for a student who always gave the right answers when presented with questions.

Alphanumeric reference characters illustrate one way to depict the hierarchy of nodes and to show the regular course delivery sequence. A dashed line in FIG. 2 extends along one topic branch of the node tree; and the topic and subtopics of that branch become increasingly specific as one moves from the central node zero along the branch toward the outer circumference to an ultimate topic, such as that represented by the node Y, which is sometimes called a twig. Assume, for example, that a student is completing the action at the twig Y, and has been following the regular course delivery sequence for some course represented by the diagram of FIG. 2. Since there are no more topics at or beyond the level of the twig Y, one finds the next topic for execution by tracing along the branch inwardly from the node Y to the topic node B1c, and then to the next topic node for execution at the level, namely, the topic node B1d. The latter topic is the last one in the regular delivery sequence under the topic B1 of the illustrated branch, and the topic B1 is itself the last topic to be executed at its lever under the next higher topic node 1. At the level of topic 1, there are, however, additional topic nodes 2 and 3. Thus, in the regular course sequence, the next topic to be considered after B1 has been completed is the topic represented by the node 2. Subtopics under topic 2 are executed in accordance with the regular course delivery sequence by completing the topics represented by the nodes A2a, A2b, etc. under the node A2. Upon completion of the topics of all those nodes at the level of node A2, the next step in the regular course delivery sequence is to move to the topic next in order at the level of the node A2, i.e., the topic represented by node B2 and its subsidiary topic nodes. Thus, course delivery regularly progresses in the fashion illustrated, passing in a clockwise manner around the central node 0 until topics represented by all nodes under the node 0 have been delivered and completed by the student.

Figure 3:
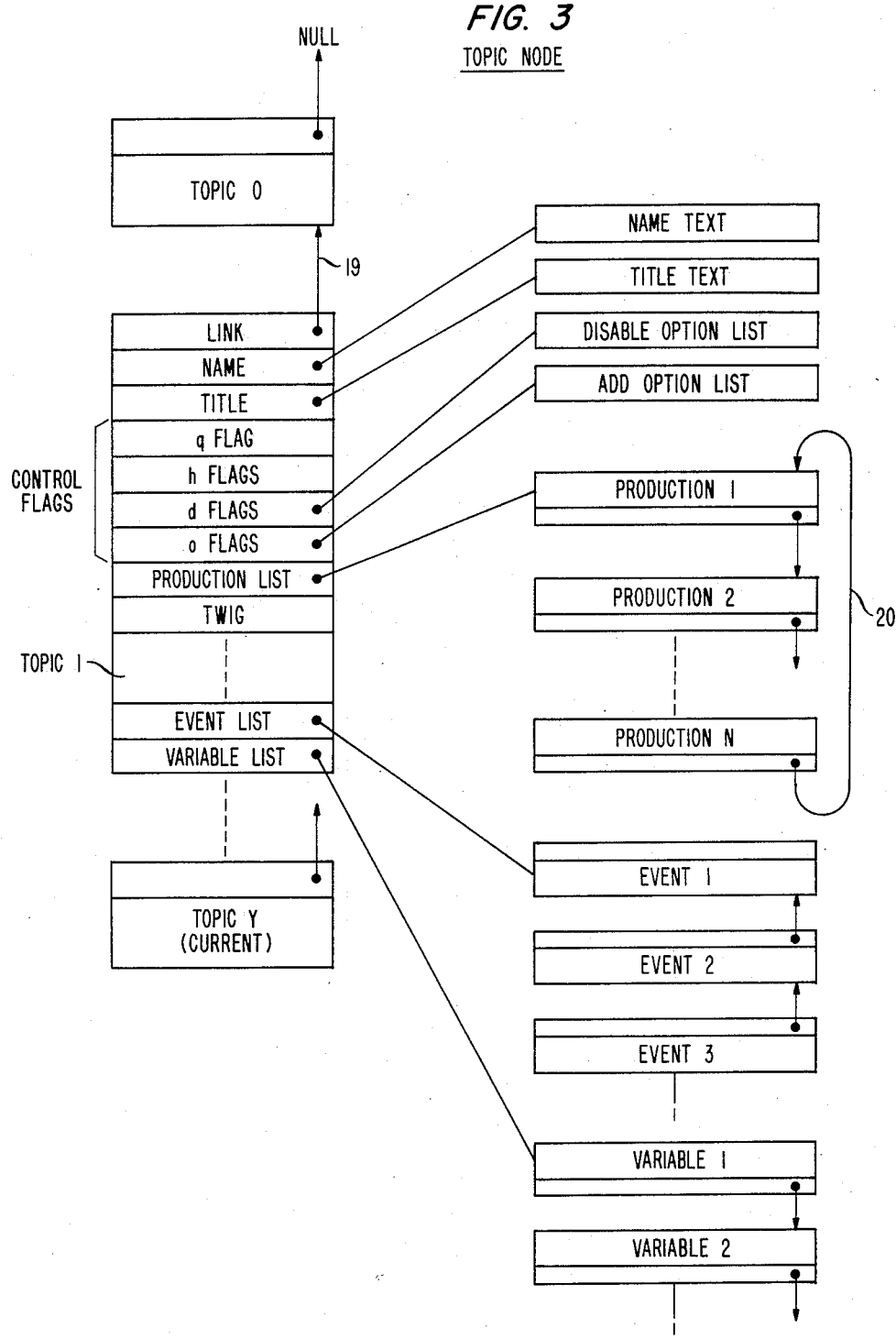
FIGS. 3 through 5 show partial maps of the FIG. 1 temporary memory, used for delivering a course structured as illustrated in FIG. 2.
Figure 4:
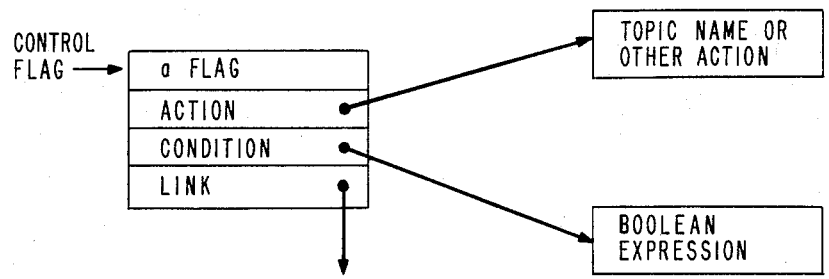
Figure 5:
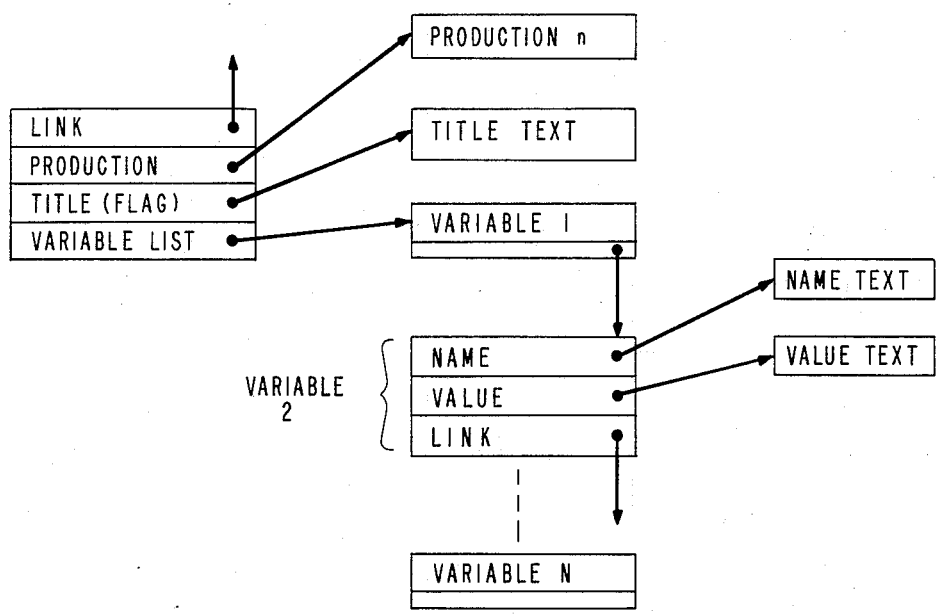

FIG. 3, and related FIGS. 4 and 5, comprise a memory map of a portion of the temporary memory 17 in FIG. 1, and illustrate the aforementioned topic definition stack. Because of the usual need to conserve space in primary memory 17, a topic definition in the stack includes primarily information representing, as by memory address pointers, actual course text stored in secondary memory. The proportion of actual course information included in the stack is a design choice governed by the type of hardware used to implement the system.

The column of boxes at the left-hand side of FIG. 3, as illustrated, comprises respective topic definitions for a level of subtopics associated with a particular topic node in the nodal tree diagram of FIG. 2. For example, assume that the illustrated region of the memory represents the subtopics under the topic node designated 0 in FIG. 2 while a student is considering topic Y. In that case, the topics on the stack are those along the dashed line in FIG. 2. Thus, the uppermost box, designated Topic 0 in FIG. 3, corresponds to the topic node similarly designated "0" in FIG. 2. The next block beneath Topic 0 represents Topic 1; and the lowermost block in the column, i.e., that designated Topic Y, corresponds to the topic node Y in FIG. 2. Subtopics under Topic 0 are nested in a manner which will be described so that a student at any given point in the delivery of a course, e.g., at the node Y in FIG. 2, is associated with the central node 0 of FIG. 2 through a branch made up of a succession of nesting topic relationships.

Each of the topic regions in the stack portion of the memory 17 shown in FIG. 3 comprises the same basic elements or structure, but includes different specific contents, i.e., different address pointers, data, and flags, or perhaps null information in one or more of the elements. Such structure, representing a topic procedure in memory, with specific contents is herein called a topic definition. That basic topic structure is illustrated for the topic 1 in FIG. 3. During course delivery, topics, such as those shown in FIG. 3 for a Topic Y currently being executed and all topics through which it was called to be executed, are included in the stack in primary memory 17.

At the outset of course delivery, a topic definition is added to the stack; and that operation is termed a "push" of the topic onto the stack. The topic most recently pushed onto the stack is the current topic, i.e., the topic to be executed currently. As execution of a topic is completed, its definition is erased from primary memory 17; and, in that operation, the topic is said to be "popped" off the stack. Administration of the stack to control pushing and popping of topics in accordance with the course delivery sequence, as modified by student input, is accomplished by a topic interpreter which will be described in connection with FIG. 6. It will become apparent that, as the interpreter operates, there is pushing and/or popping of topics with respect to the stack to work out to a twig before educationally significant information is displayed to the student as a result of execution of that twig topic.

A topic definition is made up of a plurality of fields, each containing at least one register location in the primary memory. Each field of a particular type is always found in the same location of a topic definition. Such a field may contain one or more segments of text, one or more binary flags, or one or more addresses pointing to other locations in memory, usually the primary memory, where certain pieces of information can be found. Those pieces of pointed information are also part of the topic definition; and they may, in some cases, themselves be topic definitions. If a register location designated for text or address contains no such information at a particular time, it is said to be null.

One field in each topic definition is a link field, and it is intended to contain a linking address directing the course delivery system to the topic to which it should return in the regular course delivery sequence when execution of the topic containing the link is completed. Such a linking address is accessed at the end of topic execution just before the topic definition is popped from the stack. Thereafter, execution of the next topic in the regular course sequence begins. The linking function is schematically represented in FIG. 3 by an arrow extending from a dot in the link field register to the next topic block above the representation of that link field if there is any such topic left to be executed. If a linking address location is null, the course delivery has been completed.

Another field in a topic definition is the title field, and this contains a topic name register and a topic title register. The "title" is the textual version of the topic title, which is displayed to a student user of the course at an appropriate point in the course delivery. This topic title register can either be null or include text, as noted, in order to achieve a binary flag function. For example, if it is necessary during course delivery to see whether or not a topic title is present in order to make use of the state of the title register as a control flag, it is this title register content which is sought. The name register is an internal identification of the topic that may be used to retrieve information about that topic from a field in secondary memory.

The flag field comprises several registers for some of the different types of binary control flags that may optionally be present in the topic definition for effecting predetermined modifications of course delivery with reference to the topic definition in which the flag apears. If a flag is present, the predetermined modification is in effect for that topic and for all topics called from, that is, linked on the stack to, that topic. If the flag is absent, that modification is not in effect. These flags are easily modifiable at the convenience of the course author when editing input to the course database. Although the different flags are distinguished in the drawing by different characters, each is advantageously implemented by at least one bit in a predetermined location of a topic definition. For purposes of illustration, four types of flags (other than the title flag) are specifically shown in the topic definition detail in FIG. 3; and these four are further described below. Another type, not specifically shown in FIG. 3, will be described in connection with FIGS. 4 and 5.

Figure 13:
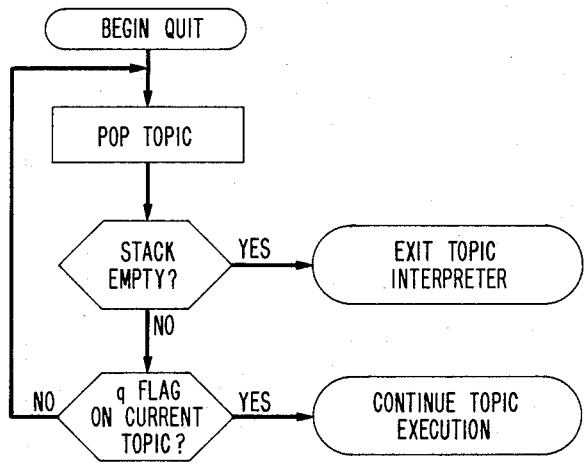

A q-flag is the first one illustrated in FIG. 3. This q-flag, which will be discussed in greater detail in regard to FIG. 13, is used for limiting the extent of transfer from one point to another in a course delivery sequence in response to a student-applied quit command. When such a command is received from a student, the course delivery program automatically scans up through the stack until a topic definition is found to contain a q-flag in the flag field thereof. At that point, the scan is terminated, and course delivery resumes at the topic associated with the flag.

An h-flag is written in the drawing as a lower case h and is a history flag. This flag is used for causing selectable types of student topic completion history to be recorded in a file kept exclusively for that particular student. The history flag can take different forms. If it appears simply as a bit in the h-flag register, the minimum history is recorded and includes simply the basic information that the student entered the corresponding topic, and that the student ultimately left the corresponding topic. In other forms, the history flag is useful for recording information that may be of assistance in repositioning a student within the regular course delivery sequence in accordance with the nature of a particular lesson or topic being executed. For example, an hr history flag causes the copying of the complete event list (to be described), compiled during the student's execution of the topic, into a student-specific file in secondary memory. If one of the other forms is in use in the topic, the presence of an address pointer in the flag register directs the system to a memory location that includes bits in predetermined locations to indicate by their respective states which forms of history flag are in use.

A disable flag d is employed for enabling a course author to disable one or more specified commands for limiting the student's options in selectable ways. Those options are made available in conjunction with a standardized topic announcement (to be described). Here, again, an address pointer in the d-flag register identifies a memory location which includes bit representation for the specific commands that are disabled. The disabling function has two aspects. In accordance with one aspect, it prevents the inclusion of the disabled command in the standardized announcement. In the other aspect, if the student gives such a command during execution of the corresponding topic, even though the command is not displayed in the standardized announcement, the system simply signals the student that an invalid command has been received.

An add flag o is employed for enabling an author to add one or more commands to the standardized list for expanding the student's options in response to the standardized announcement. A pointer to an Add Option List register identifies the added options.

Also included in the topic statement of FIG. 3 are three list fields that may or may not contain pointer address information, depending upon the character of the particular topic in one case, and the nature of the results from a student's consideration of the topic in the other two cases. The three are fields for a production list, an event list, and a variable list, respectively.

The production list register includes a pointer to a linked list of production nodes identifying subtopics which can be called under the current topic. So, such a node is sometimes referred to as a topic call. The linked list of productions is further characterized in that it is circular. Thus, the completion of the first projection causes the second to be called, and so forth, in sequence until the Nth production has been called and completed. Thereafter, the first production in the list is once more called, as schematically represented by the arrow 20 looping back from the Nth production to the production number 1. An individual production node structure memory map is to be described in connection with FIG. 4. If a topic is a twig, the projection list register contains a null value.

An event list register is also included in the FIG. 3 topic definition. This register contains a pointer to a linked list of event nodes in temporary memory 17. In event nodes, there may be found information about productions which have been completed by the student engaged in executing the course. The event list is null, either in a topic which is a twig, or in a topic which has not yet been started by the student. The event list grows as the projections of the topic are considered by a student. As each new event consideration is recorded, or stored, it is associated with a pointer to a head address of a last prior recorded event to facilitate a search of the event list. In this case, however, the address linking system is not circular. If the student has considered the topic before, and if the hr history flag is set, then when the topic is called again, the event list is restored to the content which it had when the student last considered the topic. An illustrative event node structure memory map will be described in connection with FIG. 5.

The variable list register in the FIG. 3 topic definition is null for all topics except twigs. In a twig, the list contains a pointer to an address in primary memory 17 where there may be found variable nodes containing specific data about the results of a student's consideration of each action comprising the twig. An event node also includes a linked variable list of the same make-up as the topic node variable list, and will be discussed further in connection with FIG. 5. For example, if the production had included a test of how much the student has learned by consideration of the projection, the variable list would indicate whether the student had passed or failed that test. Upon completion of a topic having an hr history flag, or upon the student leaving such a topic, the system transfers the event list contents to the student's history file.

FIG. 4 depicts a memory map of a production node of the type mentioned in connection with FIG. 3. This node typically includes four registers, which are advantageously in a file in the secondary memory 18 rather than being included in the temporary primary memory 17.

A first register is a binary flag register and contains an announce flag bit a. An announce flag bit in the ON state, e.g., a binary ONE, places the terminal in a command mode in which it can receive and execute user commands; and it initiates the display of the aforementioned standardized announcement when the associated projection is accessed. The announce bit is also used in at least one case, to be described, to limit the extent of an address-generic transfer by a student among topics in the course to points where the student can enter further commands. An address-generic transfer is one in which the command requires a certain type of action, e.g., skip or repeat, and does not include, as part of the command, a specific destination address. The announce flag transfer extent limiting function is often used in conjunction with, but is not the same as, the same function of a title flag. A title may be used to identify the transfer location for the student.

The second register in the projection node is an action register, and it points to a secondary memory 18 location containing the machine representation of the topic name or other action name with which the production node is associated. Other actions might be, for example, a return action (to be described) or a simple set action, such as "set X O", which assigns the value "$\phi$" to the variable "X." A production may itself refer to an action, which is a subtopic definition, which could also refer in its production list to one or more subtopics, which refer to actions which are sub-subtopic definitions, and so forth. This, together with the topic node linking mentioned in regard to FIG. 3, is the topic-subtopic-nesting to which reference was previously made. If a topic definition production list field is null, the topic is a twig; and its required action is specified in the twig register in FIG. 3 which gives the address of the twig instruction in secondary memory.

A third register in the production node is a condition register, and it points to a secondary memory location containing a Boolean expression, if one is appropriate for the particular production, defining the condition under which the production is to be executed. For example, it may contain an IF statement having an effect, such as "do this action only if production 3.2 already appears on the event list of the current topic under execution." Alternately, the condition register may point to a WHILE statement, having an effect, such as "do this action while awaiting a specified student command input."

A fourth register in the production node contains the linking, or pointer, address which links the current production node to the next one in the circular production execution loop indicated in FIG. 3.

FIG. 5 is a memory map of an event node of the type indicated in FIG. 3. This segment of memory also is typically located in a file in the secondary memory 18. Four registers are included in the event node. A first one of the four contains the linking address which points to the address of the last prior event node which was added to the event list. The second register is a production name register; and it identifies, e.g., by production number n, the production with which this event is associated.

A third register in the event node is a title register, and it may contain a machine-readable representation of the title text which would be displayed to a student engaged in studying this particular production. This title information is copied from the "topic title" register of the topic stack in FIG. 3 at the time that the topic called by the indicated production is being executed.

The final register in the event node of FIG. 5 is the variable list register, and it also (as well as the variable list field of the FIG. 3 basic topic definition) contains a pointer to a linked list of variable nodes, one node for each variable recorded in association with the event, or the topic in the case of the FIG. 3 variable list. Each variable node includes three registers, as shown for the second variable in FIG. 5. A first register contains a pointer to the name of the variable. A second register contains the value of that variable, as previously discussed. A third register is the link register, which contains an address pointing to the next node in the variable node group, if there is another in the group.

The operation of pushing a topic was previously mentioned. Topic φ is pushed when the interpreter starts, perhaps as the result of a student selection; and subsequent topics are pushed by topic calls, as in a production action. That topic name is used by the course delivery system to locate the topic definition in a topic file of the database. The topic definition thus obtained is then placed onto the stack and becomes the current topic. If the topic definition has a history flag set, a record indicating the start of execution of the topic is written in the student's history file. That record includes the topic name and, optionally, the time of day. If the topic includes a production list, and if the history flag in the flag field is a resume-history flag hr, then the event list pointer and the current production pointer are set to the last values, if any, recorded in the student's history file, so that consideration can be resumed from that point.

In the field of computer-assisted instruction, there are various course delivery techniques which are known; and they include various topic-interpreting techniques for controlling the accessing of the different parts of the course material in a course database in appropriate segments and delivering these segments by displaying them to a student. Some of these topic-interpreting techniques allow substantial control over course delivery sequence by the student, and some do not. The topic-interpreting technique, presented here for illustrating the present invention, is one allowing a student substantial control. The topic interpreter is useful beyond the computer-assisted instruction system environment in which it is here illustrated. For example, many types of user-interactive computer systems include a facility for explaining to a user some aspect such as a system command. The topic interpreter, to be discussed in connection with FIG. 6, is useful for delivering such explanations.

Figure 6:
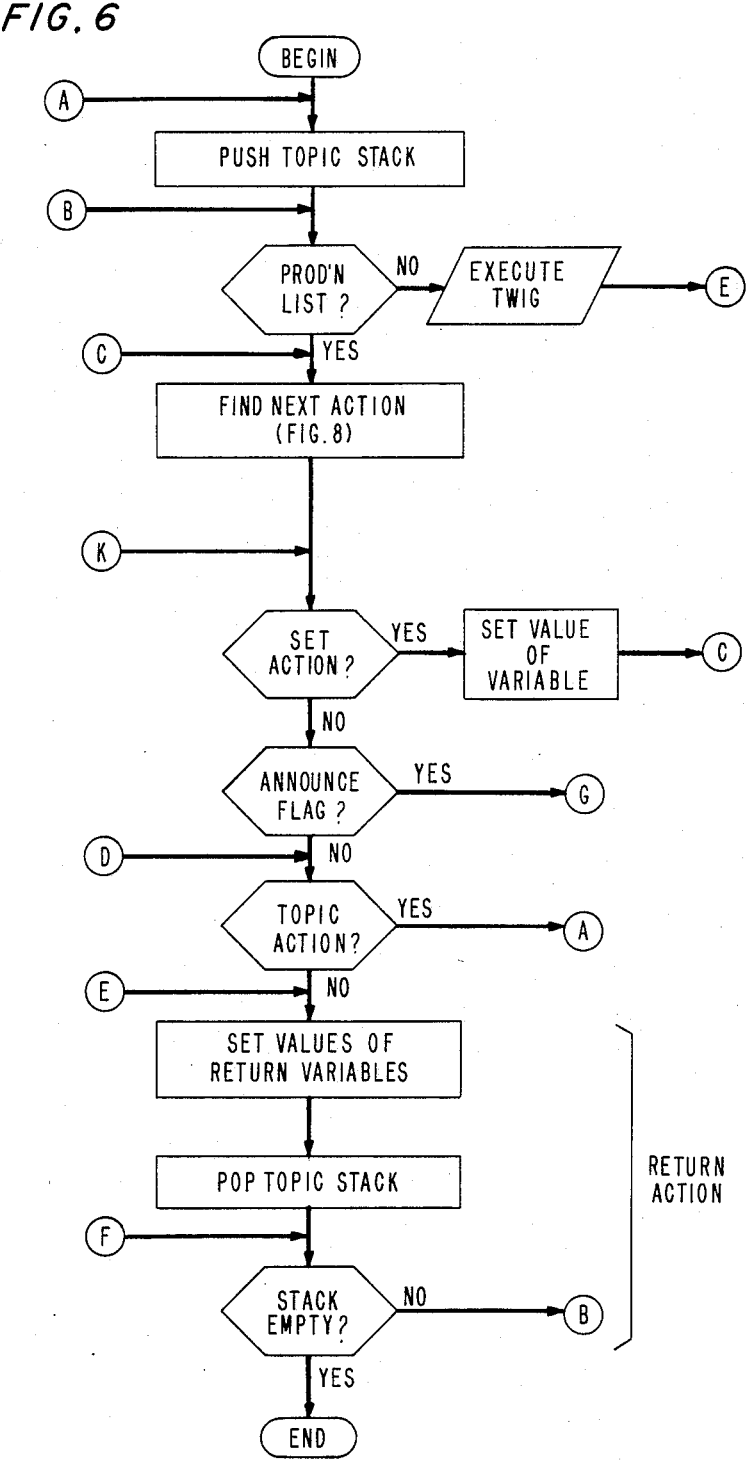
FIGS. 6 and 7 contain the two parts of a process flow diagram of a topic-interpretor routine to be utilized in the central processing unit of the system of FIG. 1.

FIG. 6 illustrates a topic-interpreting process advantageously employed in a course delivery operation in which the present invention is utilized to facilitate delivery of successive topics and their nested components. Respective steps of the illustrating process are either readily implementable by those skilled in the art or are illustrated in greater detail, in related figures, of steps which are so readily implementable. The process is hereinafter described, and illustrative pseudocode is included in the Appendix.

The topic interpreter decides for the system on what branch, and where on the branch, of the node tree the system is presently working. Then, the interpreter causes an appropriate type of execution to be performed for that location. For example, it administers the FIG. 3 stack structure either to extend topic nesting out (by topic actions, or calls) from the root, or central trunk portion, toward a twig that enables new information to be displayed to a student or to decrease nesting inward (by return actions), usually temporarily, to attain ultimately a new set of twigs associated with a different topic or subtopic. Having identified a particular twig for delivery to the student, the interpreter causes execution by display of information designated in the twig topic definition. At appropriate points in the stack administration, selected by the course author by a-flag placement, as already described, the interpreter process causes a standardized announcement to be displayed to inform the student that a subject matter, i.e., topic, change is about to take place, so the student can elect how to proceed from that point.

The main algorithm of the topic interpreter of FIG. 6 places, or pushes, topic definitions onto a stack, such as the memory stack illustrated in FIG. 3, and removes, or pops, individual topic definitions from the stack as execution thereof is completed by the student.

The algorithm begins by pushing a first topic onto the stack, expands or contracts the stack as course delivery proceeds, and ends when the stack is empty. For purposes of illustration, it is assumed, in terms of the FIG. 2 node tree, that initial topic is the topic No. 0. An item on its production list caused topic No. 1 to be added to the stack, and an item on the topic No. 1 production list caused topic No. B1 to be pushed onto the stack. At this point, it is further illustratively assumed that course delivery is in some phase of the execution of topic No. B1, so topic Nos. 0, 1, and B1 are on the stack. As each topic is pushed onto the stack, its link register is loaded with the address of the last prior topic pushed onto the stack.

The last topic placed on the stack is the topic which is to be currently executed and is, therefore, referred to as the "current topic." In FIG. 6, the current topic B1 in the illustration previously mentioned, is first tested to determine whether or not it includes a production list. If not, it is a twig, say, lying at an outer extremity of the node tree of FIG 2. When the call for the twig is invoked, a protocol, many of which are known in the art and comprise no part of the present invention, is invoked for executing the twig; and it specifies the test and/or the graphics to the displayed; and it also provides for keyboard responses which may be solicited from the student at the terminal 10. This execution of the twig topic is the instructional output point as far as a student is concerned. The remainder of the FIG. 6 process, and any interaction therein with a student, relates to administration of the memory stack; and that remainder is largely unobserved by the student. Following execution of the twig, the process jumps to point E in FIG. 6 to perform a return action.

A return action is one in which the system returns from the current topic to the topic from which it had been called, and the return action includes the steps following point E in FIG. 6. Thus, the values of current topic variables, e.g., student test results, are set. That is, variables in the list pointed from the current topic variable list register (or from the current production, event node, variable list register in the case of a non-twig topic) are copied into the variable list of the event node for the production of the topic which had called the current topic. Next, the topic stack is popped to remove the current topic definition. Finally, the topic stack is tested to determine whether or not it is empty. If it is empty, the topic interpretation ends because the course is at an end. If the stack is not empty, the process loops back to point B in FIG. 6, i.e., steps to the next topic (the one from which the topic just popped had been called), in the regular course sequence using the linking address from the topic just popped; and the new topic is tested for a production list.

When a current topic is reached which includes a production list, that list is searched to find the next action suitable for execution. The condition of the first, or other appropriate, production on the list is evaluated to determine whether or not its condition is true, indicating that an executable action was found. The combined operations of finding the next action and deciding whether or not an action was found will be hereinafter discussed in greater detail in connection with FIG. 8. If, in the course, of finding that next action, no true condition is found, i.e., the condition for each action was false, execution of the production list stops for lack of a new executable action. The process jumps to the point E in FIG. 6 to perform a return action, as previously discussed. In terms of FIG. 6, there is no variable to be set in the case of no true condition, so the topic is popped, as noted. However, if an action had been found, process tests are made to determine the type of action required.

If the found action is a set action, the value of a variable specified in the action must be recorded in a variable node of the event node of the production. Accordingly, the value of the variable is set in the appropriate available variable node of the event representing execution of the action that had been found. The process then returns to the point C to attempt once more to find the next action that requires execution.

Consider the negative result of the set action decision. It is indicated in FIG. 6 that an announce decision must then be made. The announce decision is based upon a determination of whether or not an announce flag is present in the announce flag register of the production node containing the action just found. If an announcement is to be made, the program goes into the command mode and branches into the branch G illustrated in FIG. 7 herein. That figure will now be described before resuming description of the process of FIG. 6.

Figure 7:
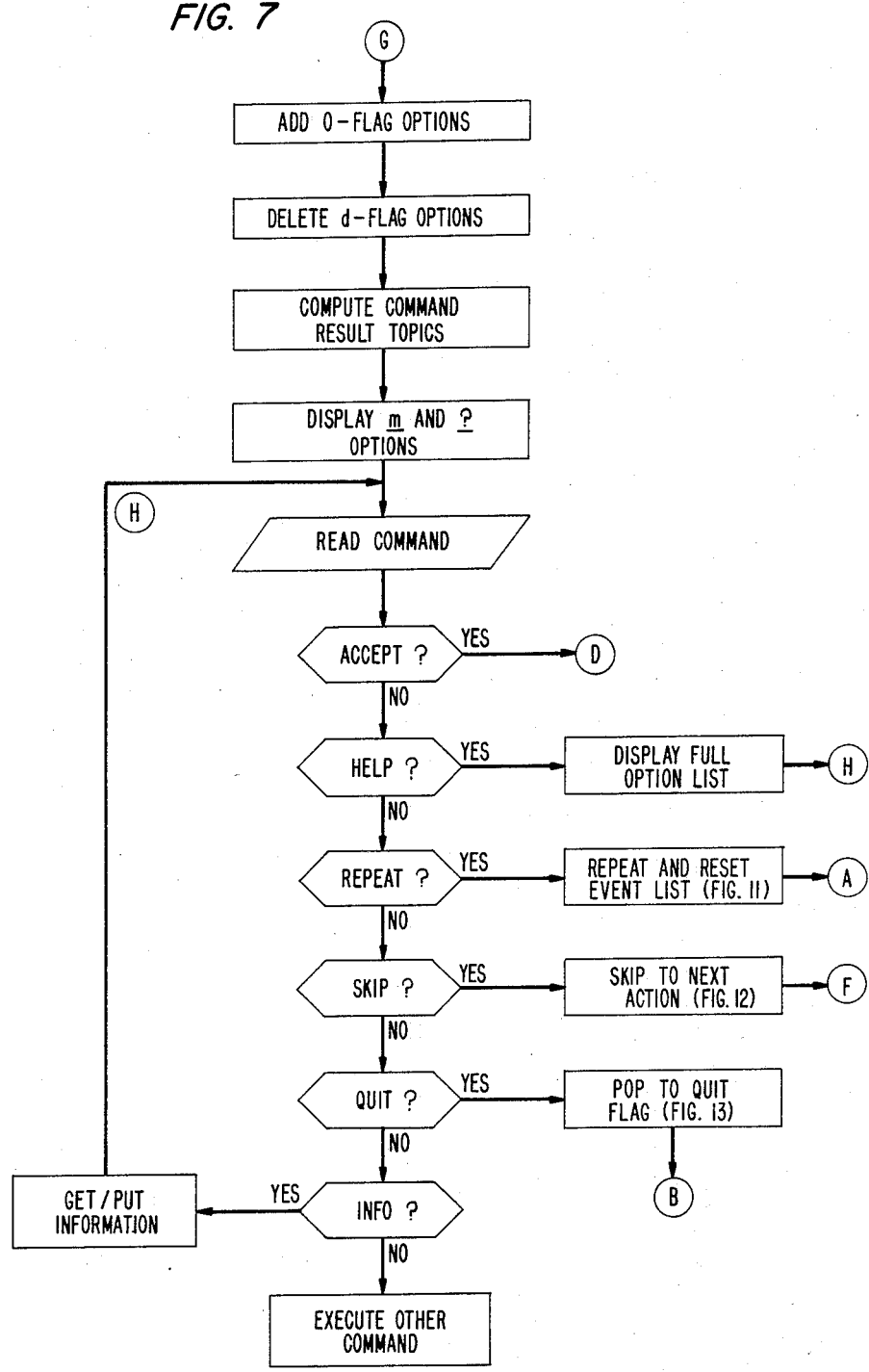

In FIG. 7, the first step of the process is to calculate valid options for the standardized option list. This is done by calling a copy of the standardized list from memory, adding any options identified by the o-flag pointer in the same definition, and deleting any command options identified by the d-flag pointer in the topic definition. That modified list then remains in effect until a new production node with an a-flag is reached.

Figure 10:
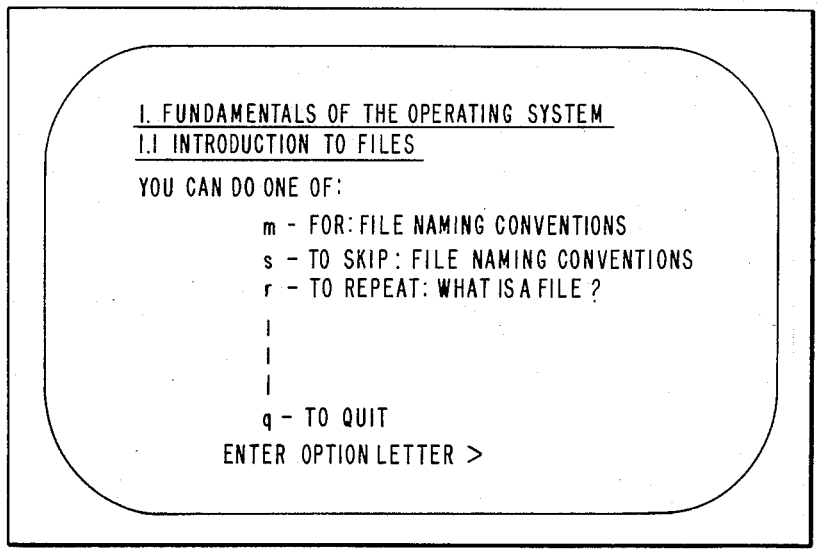

Topic titles characterizing the nature of each command remaining on the modified standard list are then computed. As illustrated in FIG. 10, the system also advantageously displays with some transfer command options, a computed characterization of command execution results, such as the computed transfer destination in terms of the destination topic title. This computing step serves at least two purposes. It enables the system to be satisfied that each transfer represents a valid destination address before displaying the corresponding title text to the student. In addition, the system then saves in memory, in association with each of the transfer command indications, the actual memory address of the corresponding transfer destination if that destination has been computed, so that, if that particular command option is selected, the transfer can be effected promptly without further computations. It is evident that, by judicious placement of control flags by a course author, in accordance with educational goals desired to be achieved by the author, the student is offered, at appropriate points, various transfer options in terms of transfer types. The specific destinations, or other result characteristics, for those types of transfer are custom computed by the system for each particular topic without the necessity for the author to include specific customized transfer addresses in the course delivery program for each particular topic.

Next, the student is given a prompt to determine, on the basis of a subsequent responsive student command, what direction the course delivery should take from this point. The student has the options at this point to accept the course delivery in the regular delivery sequence by giving a first command m, or by giving a command indicated by a question mark in order to produce an expanded display of the student's options that are available, as illustrated in FIG. 10. (Note that those commands are available to a student only when the topic interpreter is placed in the command mode by the a-flag which initiates the standard announcement.)

Figure 9:
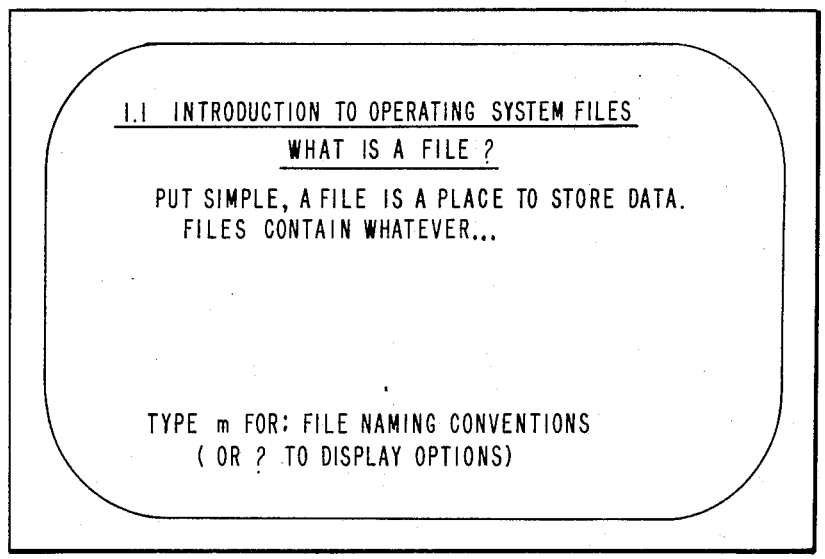
FIGS. 9 and 10 depict terminal displays, or screens, illustrating an announcement produced during the process of FIGS. 6 and 7.

An illustrative display, or screen, for providing the aforementioned prompt is illustrated in FIG. 9. There, the upper portion of the screen displays text for a topic designated 1.1 and entitled "Introduction to Operating System Files." The current subtopic under that topic, i.e., the current production action or topic name, is entitled "What is a File?"; and text describing a file is displayed thereafter, several lines being illustrated in FIG. 9. At the bottom of the screen in FIG. 9, there appear, assuming this screen to be the final twig in the delivery of the subtopic, two command options. One is contained in a legend "Type m for: File naming conventions." That legend indicates to the student that the next subtopic under the topic "Introduction to Operation System Files" will be the subtopic "File naming conventions." If the student wishes to continue with the course in the regular sequence of course delivery and move into that latter subtopic, the student simply types m, and course delivery proceeds. This is the affirmative result of the Accept test in FIG. 7, and the process thereafter returns to point D in FIG. 6. However, if the student wishes to consider other possibilities, there appears below the aforementioned legend a further option represented by a legend stating "(or ? to display options)." The system is also advantageously arranged so that a student who remembers the standard option list can enter an appropriate command, instead of "?," at this point; and the Read Command function secures the appropriate result if it had not been deleted.

Assuming, however, that the student follows the more fundamental procedure of either accepting the indicated next topic or calling for the list display, an affirmative result on the Accept test causes the process to return to point D in FIG. 6. A negative result is a call for help; the system presents the FIG. 10 type of display; and then it returns to point H in FIG. 7 to await a command entry from the student.

In FIG. 10, there is a display of a standardized set of command options (in a different order from that shown in FIG. 7) which are made available to the student user of the course as a part of the announcement function indicated on the screen in FIG. 9. The command options in FIG. 10, and represented in remaining portions of FIG. 7, will be subsequently more fully discussed. For the present, however, it is assumed that the student selects an option, and that the system performs the necessary execution and then returns to FIG. 6 at the appropriate point for that command. Selection among the FIG. 10 options is made by entering, i.e., typing, an appropriate one of the indicated option letters. Some of the command options represent transfers to different points in the course delivery system, and several of those options are also indicated in the illustrative command decisions in the subroutine process flow diagram of FIG. 7.

It should be noted as the description proceeds that the transfer commands are address-generic commands in that a student entering a command indicates simply the type of transfer movement that the student desires to achieve. The system then associates that transfer command with the result earlier computed and provides execution accordingly.

The first option on the expanded display of command options in FIG. 10 (but not shown in FIG. 7) is a repetition of the m command option to select the next topic in the regular course delivery sequence. That is, the student decided the help was not needed. Selection of the m option at this point has the same effect as before, i.e., return to point D in FIG. 6.

The next option in FIG. 10 is a skip command indicated by the letter s. System response transfers in such a way as to skip the next topic just announced and illustratively characterized again as "File naming conventions." Details of the process for executing the skip command will be described in connection with the diagram of FIG. 12. For the moment, however, it is noted that the system will skip over the topic entitled "File naming conventions" and search the current production list for the next announced topic in the regular delivery sequence. That search may include a return action. The skip search is terminated by locating a top having both an a-flag in a flag field of a production node and a specific title in the title name text field of the corresponding event node, and independently of whether or not the student has already completed the newly located topic. When an appropriate destination, indicated by the control flags, is found, the program returns to point F in FIG. 6 (as noted in FIG. 7) to test whether or not the stack is empty, as previously described. Assuming that it is not, the process of FIG. 6 loops to B and begins the production list test in the skip destination topic definition.

Similarly, if the student types the letter r to enter the repeat command, the system transfers the course delivery back through the current topic event list looking for a topic title flag. For the illustrative case in FIG. 10, that means a return to the beginning of the topic entitled "What is a file?" To realize that result, the repeat command causes the system to go back through the topic event list looking for a topic title control flag, and resetting both the topic event list and the current production pointers as it goes. This enables the user to go through the normal sequence of actions for that topic from the beginning once more. The achievement of that course destination will be described in more detail in connection with FIG. 11. Upon completing those repeat transfer functions, and as shown in FIG. 7, the program then transfers to the point A in FIG. 6 to push the topic stack to restore the repeat topic (which is generally the last topic with a title that was pushed on the stack by the topic from which the announcement was made).

Entry of a quit command pops the topic stack until either the stack is empty, in which case, the student leaves the topic interpreter, or a topic with a quit flag is found on the stack. Upon locating the quit flag, and as shown in FIG. 7, the process returns to point B in FIG. 6 to resume execution of the topic with the q-flag. The latter alternative of limiting transfer by a quit flag represents a customized procedure that allows a student to emerge from the current topic without leaving the course delivery system.

It is shown in FIG. 7 that various information commands, not shown in FIG. 10, can also be made available to a student to allow input of information or display of information. For example, a student may be permitted to obtain information, such as a list of titles of topics near the current topic in a course table of contents, or a list of topic titles associated with keywords entered by the student, or an explanation of the computer-assisted instruction system. Similarly, the student may be permitted to enter comments to be delivered to the course administrator's electronic mailbox. Display of such material as is necessary for the information exchange typically requires the student to order a program return when ready; and the process then loops back to point H in FIG. 7.

If no information exchange is selected, the student may also be permitted to give either any other commands a course author deems appropriate for inclusion in the standard command option set, or any o-flag added command options. Of course, each such command option involves an appropriate return to FIG. 6. There is no FIG. 7 default action, and failure of a student to act upon one of the available options stalls course delivery at this point.

The standardized command option display of FIGS. 9 and 10 can, of course, be advantageously tailored by the course author to suit the educational needs and goals envisioned by the author. An important aspect of having such a standardized display is that it allows the author to exercise control over the availability to the student of a given set of options by simply placing a control flag, i.e., the announce flag, at an appropriate point in the memory map of the course delivery system. It should also be recalled that even further flexibility is available to the author by including, in appropriate topic control flag fields, the disable flag or the add option flag. Those flags cause the process to disable any particular commands which the author deems should not be available to the student, or add extra commands that should be available, at any particular topic.

Returning now to FIG. 6 at the announce flag decision point, and assuming no announcement is to be made, a decision must be made as to whether or not the current action is a topic action. Such an action is one in which the production node action register names a new topic, and thereby causes the process to leave the production list of the current topic by calling a new topic, e.g., B1a, further out on the same branch in FIG. 2. In that event, the process transfers to the point A in FIG. 6; and the new topic is pushed onto the stack, as is appropriate for a transfer to the next level of course delivery, i.e., moving outward along a branch in the node tree of FIG. 2.

If the topic action decision is negative, the new action is not a topic action; so it must be a return action since that is the only other type available in the illustration. That is, execution of the production limit actions of the current topic has been completed to the extent possible; and the process must move by way of that topic's linking address to the next higher topic level, i.e., returning inward along the FIG. 2 branch to the topic which called the current topic. At this point, selected variables are returned to the calling topic. One of those variables has the same name as the topic, and is sometimes referred to as the "topic state variable." The values of the specified variables are recorded in the appropriate available variable nodes of the calling topic's event representing execution of the current topic just completed. Also, the values of variables collected in the topic event nodes in the course of execution of the topic production list just completed are set in the student's history file if an hr history flag is in the flag field of the current topic. Upon completion of the setting of the return variable values, and possibly recording history data, the topic is popped from the production list stack. A test is made to determine thereafter whether the stack is empty. If the stack is not empty, the process returns to the point B in FIG. 6 to test whether or not there is a production list in the next linked topic on the stack. On the other hand, if the stack is empty, the topic interpreter process ends; and, because of the nesting nature of the various topics in the hierarchical tree, the course is at an end also.

Figure 8:
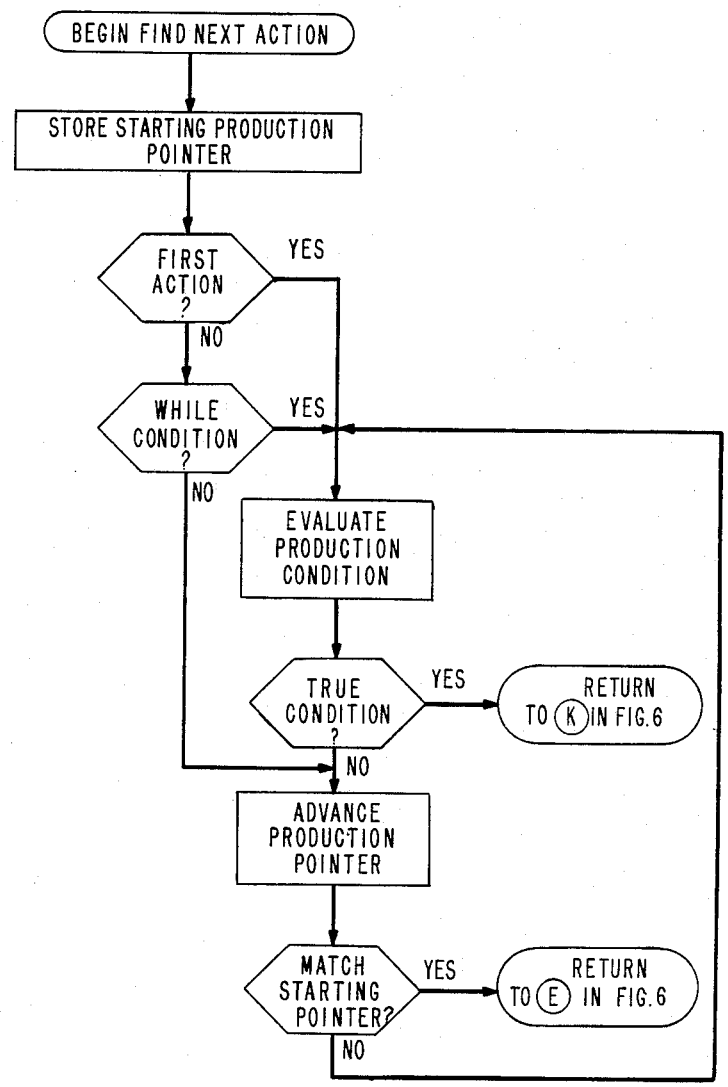
FIG. 8 is a process flow diagram of a "find next action" function used in the diagram of FIG. 6.

FIG. 8 illustrates a process flow diagram for the process of finding the next production action with a true condition, as previously indicated, following the point C in FIG. 6. Initially in FIG. 8, the starting production pointer, i.e., the pointer value at the time that the "Find next action" subroutine was begun, in the production list of the topic is stored for future reference. Then, a test is made to determine whether or not the current action is in a production which is the first on the production list after that indicated by the starting pointer. If not, a test is made to determine whether or not there is a while condition associated with the current production; and, if not, the production pointer is advanced. If either test produced an affirmative result, the condition associated with the current production is evaluated to determine whether it is true or false. If the condition is found to be true, the process returns to point K in FIG. 6. If the condition is not true, i.e., the production is not to be executed at this time, the production pointer is advanved in the circular production list to the next production thereon.

After each advance of the production pointer, the new current production pointer is compared to the starting production pointer. Absent a match with the starting production pointer, the FIG. 8 process loops back to evaluate the condition of the new current production without concern for whether it is first after the starting production, or whether it involves a while condition. If there is a match, it means that the entire production list has been considered; and the process returns to the point E in FIG. 6 to execute a return action, i.e., move up the topic stack to consider the calling topic definition.

Figure 11:
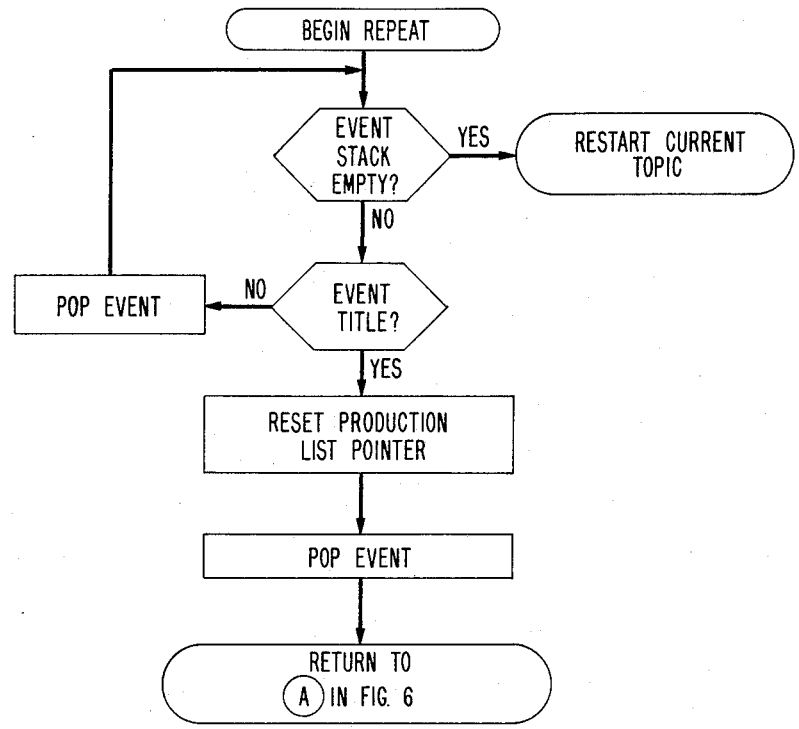
FIGS. 11 through 13 are process flow diagrams for execution of three transfer commands illustrated in the diagrams of FIG. 7.

FIG. 11 depicts in more detail a process flow diagram for execution of the repeat command previously mentioned in connection with FIGS. 7 and 10. This command operates within only a single topic, and it scans the event node stack of the current topic. The process begins by testing whether or not the event stack is empty, that is, whether or not the event list pointer of the current topic is null. If it is null, the current topic is simply restarted, beginning with the first production. If the event stack is not empty, the process tests to see whether or not the current event includes a specific title text in its event node. That is, it tests for the state of a title control flag. If there is no title text, then the process pops that event off the event stack; that is, the event is removed from the stack in the topic definition, and the process loops back to determine once more whether or not the event stack is empty. If it is not empty, the new current event is tested. When an event is found that has a specific title in its title register, the production pointer of the topic definition is reset to the production number indicated in that event node. Then, the event on which a title test was just completed is popped from the event stack. Thereafter, execution of the current topic is resumed at A in FIG. 6.

Figure 12:
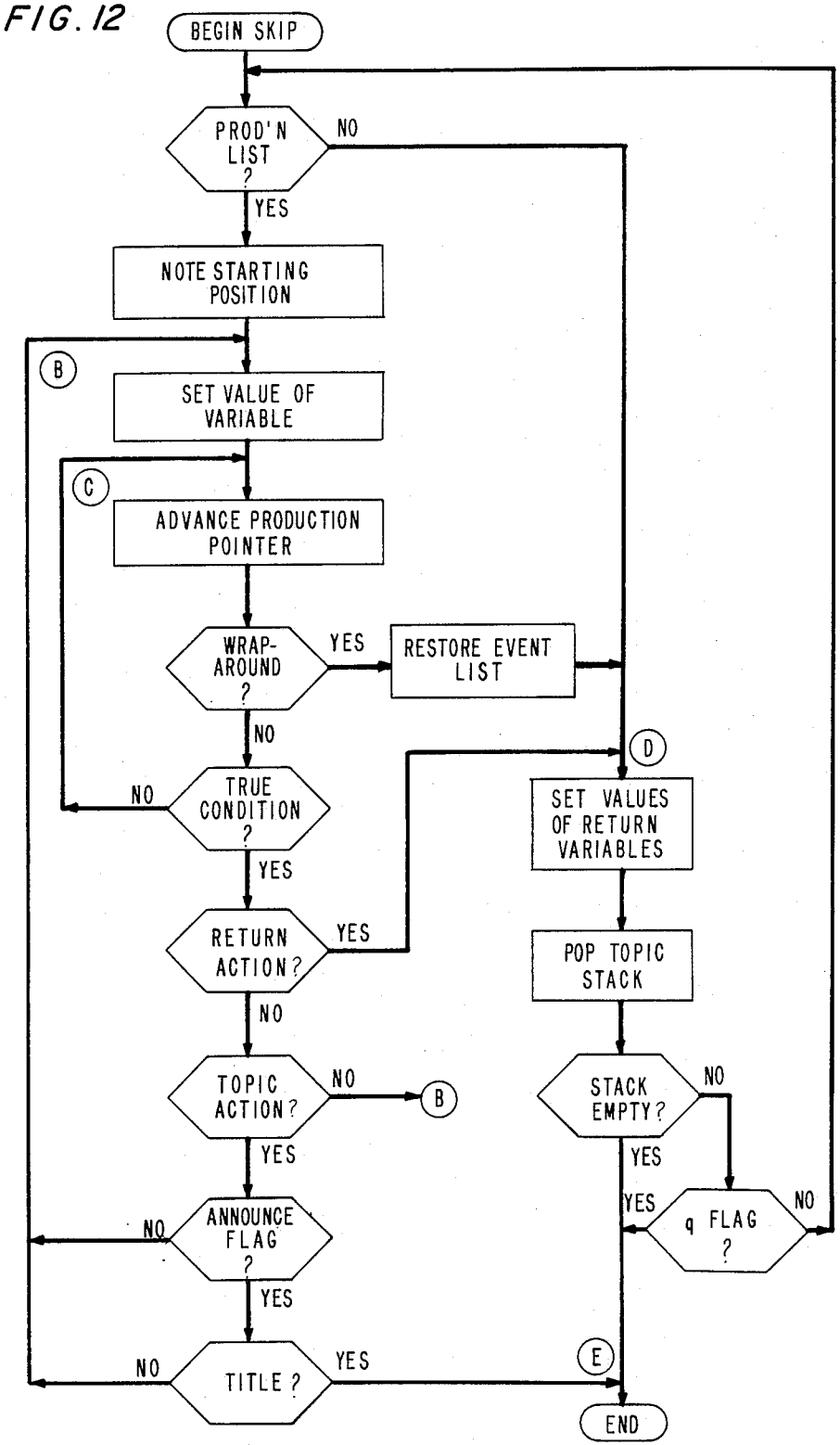

FIG. 12 depicts a process flow diagram for the execution of a skip command by which a user can skip an announced topic action of a production list. The algorithm for skipping a topic involves finding a production action on a production list with a true condition and an a-flag, which action is a return action or a topic action with a title flag in the topic node. When the process of FIG. 12 begins, a test is made to determine whether or not there is a production list, i.e., the production list register is null. If there is no list, the process jumps to D in FIG. 12 to perform return action functions similar to those described for point E in FIG. 6. If, as a result, the stack is found not empty, the process tests for a quit flag in the current topic definition. If there is a quit flag, the process goes to E in FIG. 12; and, if not, it loops back to A in FIG. 12 to test the production list again. If the stack is found empty, the process goes to E in FIG. 12, i.e., it ends. Since that ending is an exit (FIG. 7) to F in FIG. 6, the topic interpreter stops.

Returning now to A, i.e., the FIG. 12 production list test and its affirmative result, that result causes the storing of the starting, i.e., current, production lists status. This involves storing the production pointer value and the event stack position number of the last completed event of the event list.

Next, for a production with a topic action, a variable value, indicating the skipping of the current production, is set in a variable node of the event node associated with that production in the current topic definition, and the current production pointer is advanced. If the new pointer matches the starting status production pointer, it means that wrap-around in the circularly-linked production list has taken place. Since there is then no benefit in further search for a transfer limiting flag in this current production, its event list is restored from its state after skipping to its state before the present skip function began. The process then jumps to D in FIG. 12 to execute the return action functions and resume, if appropriate, the search for an a-flag in the calling topic.

If the new pointer does not match (no wrap-around) the starting production pointer, the production condition of the newly pointed production is evaluated. If the condition is not true, the process loops back to C in FIG. 12 because the new production is not ready for execution; and the production pointer of the topic definition is advanced again. Otherwise, the condition is true; and the new current production action thereof is tested to determine its type. It is first tested to see if it is a return action by looking for a return-action in the location pointed by the value in the action register of the production node. If a return-action is found, the process jumps to D in FIG. 12 to perform the return functions, including popping the topic stack, so the search for an a-flag can resume in the calling topic.

If an action was not found to be a return action, it is tested to determine whether or not it is a topic action by looking for a topic action in the location pointed by the value in the action register of the production node. If it is not a topic action, it must be a set action; and the process loops back to B in FIG. 12 to execute the set action. However, if the action is a topic action, the algorithm of FIG. 12 tests the production definition to see whether or not it is an announced action, and whether or not the topic named in the action has a title.

If both conditions prevail, the skip subroutine has ended; and (as indicated in FIG. 7) the process exits to F in FIG. 6. However, if either flag is missing, the FIG. 12 subroutine loops back to B to set a variable indicating that the topic action is being skipped.

FIG. 13 depicts a process flow diagram for the execution of the quit command. This command execution begins with the popping of the current topic from the topic stack illustrated in FIG. 3. That takes place, whether or not the current topic has been completed. The linking address of the popped topic is also checked at this point in the program; and if it is null, the stack is empty, i.e., the last topic has been popped therefrom, and execution of the topic interpreter program ends. However, if the stack is not empty, there will be an address in that linking address register; and the program transfers to that address to call up the next topic definition. In that new topic definition, the flag field is checked to determine whether or not there is a q-flag present. If there is no q-flag, the process loops around to pop that topic from the stack and check again to see whether or not the stack is empty. However, if there is a q-flag in the flag field of the new topic, the process then continues (at point B in FIG. 6) with execution of that new topic in accordance with the procedures of the topic-interpreter program previously discussed in connection with FIG. 6.

A process like that of FIG. 13 is also used in the case of an optional added command using the o-flag. For example, if the added command were f—"find new topic using keywords," and the student selected it, the process of FIG. 13—checking for an of-flag, instead of the q-flag—causes a search of the entire topic stack as it exists at the time. If no of-flag is found on the stack, then the interpreter stops. In this way, control is transferred back to the process that invoked the interpreter.

It should be noted at this point that a conventional ASCII keyboard usually includes a "break," e.g., DEL, key. The student can, by using that key, enter a break command at any time during course delivery without awaiting the display of an announcement of command options. The entry of a break command, when in the present course delivery program, has the same effect as the entry of a skip command received following an announcement display, and which has been hereinbefore described.

Although the present invention has been described in connection with a particular application and embodiment thereof, it is to be understood that additional applications, modifications, and embodiments, which will be obvious to those skilled in the art, are included within the spirit and scope of the invention.

APPENDIX

```
PROCEDURE interpret_topic
     BEGIN
     CALL push_topic
     DO
             IF (current topic is production list)
                 BEGIN
                 CALL find_action
                 IF (valid production action found)
                     IF (set action)
                         CALL record_event
                     ELSE IF (announce flag)
                         BEGIN
                         CALL command_option
                         IF (production action ready
                             signal set)
                             CALL topic_stack
                         END
                     ELSE
                         CALL topic_stack
                 ELSE
                     CALL pop_topic
                 END
             ELSE
                 CALL twig_topic
     UNTIL (topic stack is empty)
     END PROCEDURE push_topic
     BEGIN
     create topic node
```

```
      read topic definition from secondary memory
      add topic node to interpreter stack
      END PROCEDURE pop_topic
      BEGIN
      create returned variable list
      remove current topic from interpreter stack
      IF (current topic is a production list)
            CALL record_event
      ELSE
            add returned variable list to twig variable list
      END PROCEDURE record_event
      BEGIN
      create event node
      record production number
      record variable list
      add event node to event list
      END PROCEDURE topic_stack
      BEGIN
      IF (topic action)
            CALL push_topic
      ELSE IF (return action)
            CALL pop_topic
      END PROCEDURE find_action
      BEGIN
      store pointer to current production (starting pointer)
      IF (first action flag set or "while" type condition)
            evaluate production condition
      WHILE (condition evaluation not "true")
            BEGIN
            advance production pointer
            IF (pointer equals starting pointer)
                  RETURN no action found
            evaluate production condition
            END
      RETURN action found
      END PROCEDURE command_option
      BEGIN
      create list of valid command options
      IF (topic action)
            read topic title from secondary memory
      display simple prompt
      WHILE (TRUE) DO
```

```
BEGIN
read valid command option from keyboard
IF (command is "accept")
      turn on action ready signal
ELSE IF (command is "repeat")
      BEGIN
      CALL event_reset
      turn on action ready signal
      END
ELSE IF (command is "skip")
      CALL skip_forward
ELSE IF (command is "quit")
      CALL quit_pop
ELSE IF (command is -o flag addition)
      CALL command_pop
      ELSE IF (command is "help")
            BEGIN
            display full list of options
            CONTINUE
            END
      ELSE IF (command is "where")
            BEGIN
            display titles on interpreter stack
            CONTINUE
            END
      BREAK
      END
END
PROCEDURE skip_forward
      BEGIN
      DO
            IF (current topic is production list)
            BEGIN
            store pointer to current production (starting
               pointer)
            store pointer to current event
            CALL skip_topic
            DO
                  BEGIN
                  advance production pointer
                  IF (pointer equals starting pointer)
                        BEGIN
                        CALL skip_pop
                        BREAK
                        END
                  ELSE IF (production condition is "true")
                        IF (announce flag set)
                              IF (return action)
                                    set action ready signal
                              ELSE IF (topic action)
                                    IF (topic title flag set)
                                          set action ready signal
                                    ELSE
                                          CALL skip-topic
                        ELSE IF (return action)
                              BEGIN
```

```
                    CALL skip_pop
                    BREAK
                    END
                ELSE IF (topic action)
                    CALL skip_topic
                ELSE IF (set action)
                    CALL record_event
            END
        UNTIL (action ready signal is set)
        END
            ELSE
                IF (quit flag set for current topic)
                    set quit signal
                ELSE
                    CALL pop_topic
            END
    UNTIL (action ready signal
           OR quit signal
           OR stack empty)
    END PROCEDURE skip_topic
    BEGIN
    set topic state value to indicate "skip"
    CALL record_event
    END PROCEDURE skip_pop
    BEGIN
    restore event list
    IF (quit flag set for current topic)
        set quit signal
    ELSE
        CALL pop_topic
    END PROCEDURE event_reset
    BEGIN
    WHILE (event pointer not equal to starting pointer)
        remove event node from stack
    END PROCEDURE quit_pop
    BEGIN
    DO
        BEGIN
        CALL pop_topic
        IF (quit flag set for current topic)
            BREAK
        UNTIL (stack is empty)
        END
```

```
PROCEDURE command_pop
    BEGIN
        DO
                BEGIN
                CALL pop_topic
                IF (option flag matching command set)
                    BREAK
                UNTIL (stack is empty)
                END
```

What is claimed is:

1. In a computer-based system, a topic-interpreting method for delivering instructional material from a database divided into segments to be accessed for display of said material on a screen of a computer-access terminal, said segments being grouped according to topics, said method comprising the steps of providing an announce routine for placing said terminal in a command mode for at least a predetermined set of commands, said routine displaying to a student both an announcement that a new topic is about to begin and a notice that the student has an opportunity to select for execution a command from among commands of said predetermined set, said set including at least one address-generic transfer command for transferring program execution to a different location in said database, and calling said routine at predetermined topic locations in said material.

2. The topic-interpreting method in accordance with claim 1 and including, responsive to said calling step, the further steps of computing for said at least one transfer command of said routine an execution-result-characterizing text, and displaying said text with a user prompt for said one command.

3. The topic-interpreting method in accordance with claim 1 in which said calling step includes the step of placing in said database announce flags at said predetermined locations, testing each topic for an announce flag, and automatically calling said announce routine when such a flag is detected.

4. The topic-interpreting method in accordance with claim 3 which comprises in addition the steps of limiting execution of said at least one transfer command, in terms of extent of transfer, by marking an end of transfer through said database by at least one predetermined marking flag in said database, said marking flag being either the same as or different from one of said announce flags, and executing said one transfer command by searching said database for said marking flag from a topic location, at which said routine was called, in a direction determined by such command.

5. The topic-interpreting method in accordance with claim 4 in which a stack is provided in a memory for storing topic definitions, each definition including at least a flag field, and said executing step comprises the steps of searching said stack for a topic definition, flag field including said marking flag, and resuming delivery of said material at a location of said marking flag.

6. The topic-interpreting method in accordance with claim 4 in which a stack is provided in memory for topic definitions, each including at least a control flag field, a topic definition for at least one topic includes a binary quit flag, said one transfer command is a quitting command, and said executing step for said quitting command includes the steps of searching said control flag fields in said stack for a marking flag in the form of a quit flag in a set state, and resuming delivery of said material at a topic definition having said set quit flag.

7. The topic-interpreting method in accordance with claim 4 in which a stack is provided in memory for multi-element topic definitions, each definition including address-linked memory locations for storing at least a part of the topic definition elements, and said executing step comprises the steps of searching at least one of said definitions and its address-linked locations for said marking flag, and resuming delivery of said material from a topic definition element having said marking flag.

8. The topic-interpreting method in accordance with claim 7 in which said linked locations include production action locations and associated event locations for storing information relating to student consideration of respective production actions of a topic definition, said event locations each includes a topic title register that may be null, said one transfer command is a topic repeating command, and said executing step for said repeating command comprises the steps of checking said title register of said event locations for the presence of a title therein as said marking flag, and resuming delivery of said material from a production action corresponding to an event location having said title marking flag.

9. The topic-interpreting method in accordance with claim 4 in which a stack is provided in memory for topic definitions, each definition including at least a topic identification field and an address-linked memory location that may or may not contain a topic title, and said executing step comprises the steps of searching said address-linked locations of said topic definitions for the presence of a topic title therein as said marking flag, and resuming delivery of said material at a topic definition having a topic title marking flag.

10. The topic-interpreting method in accordance with claim 9 in which said system includes means, actuatable by a user at any time during instruction material delivery, for entering a delivery sequence break command, and said searching step comprises the step of advancing in said sequence to a topic definition including both an announce flag and a topic title.

11. The topic-interpreting method in accordance with claim 9 in which said one transfer command is an instruction skipping command and said searching step comprises the step of advancing in said sequence to a topic definition including both an announce flag and a topic title.

12. The topic-interpreting method in accordance with claim 1 in which a stack is provided in memory for at least one topic definition of a topic currently being executed, said definition including a control flag field for a command set modification flag and an indicator for designating set modification, and said method includes the steps of detecting a predetermined state of said modification flag and of said indicator, and modifying said command set in accordance with said states.

13. The topic-interpreting method in accordance with claim 12 in which said command set modification flag is a command disable flag, said indicator is a command code for at least one of said commands of said set, and said method includes the step of deleting said at least one command-code-designated command from said set during execution of the topic of said at least one topic definition.

14. The topic-interpreting method in accordance with claim 12 in which said command set modification flag is a command addition flag, said indicator is a command code for at least one further command to be added to said set, and said method includes the step of adding said at least one command-code-designated command to said set during execution of the topic of said at least one topic definition.

15. In a computer-assisted instruction system in which textual courseware is delivered by the transfer of predetermined text segments from memory to a display at a user-interactive terminal, the courseware being divided into an outline hierarchy of topics in which a topic definition includes a title and one or more actions represented by various unit displays of course material, a method for user-controlled transfer of courseware execution among said topics, said method including the steps of storing in association with predetermined ones of the topic definitions a control flag to initiate a command option routine, announcing, by display to a user in accordance with said routine, that a new topic is the next topic to be exeucted, and making available to said user a predetermined set of user-selectable, address-generic command options for transfer through said courseware.

16. In a computer-assisted instructiion system in which textual courseware is delivered by the transfer of predetermined text segments from memory to a display at a user-interactive terminal, the courseware being divided into an outline hierarchy of defined topics, in which a topic definition includes a title and one or more actions, the method for controlling transfer of courseware execution among said topics and comprising the steps of announcing, to a user during execution of only predetermined ones of said topics, that execution of a new topic is about to begin, making available, in conjunction with said announcing step, a predetermined set of user-selectable, address-generic, command options for transfer through said courseware, storing, in association with predetermined ones of the topic definitions, at least one control flag designating a qualification on execution of predetermined commands of said set occurring during execution of that topic, and executing received user commands in accordance with any one or more control flags therefor.

17. In a computer-assisted instruction system for delivering from memory course material comprising a predetermined ordered sequence of topics for user perception and reaction, by entry of appropriate commands to the system, a method for interpreting said topics out of memory to said user under limited user control, and comprising the steps of constructing a predetermined array of topic definitions, each including at least one predetermined control flag field, placing in a control flag field of topic definitions of preselected ones of said topics an announce flag, announcing to said user, in response to said flag on execution of each of said preselected topics, the availability of said system to receive and execute a selectable command of a predetermined command set, and setting in a control flag field of a topic definition of preselected ones of said topics at least one control flag for initiating a predetermined command exeuction modification.

18. The topic-interpreting method in accordance with claim 17 in which at least one of said topic definitions includes an action field for identifying a particular system action to be executed, and said setting step includes the step of setting a control flag for initiating a command exeuction modification effective only in execution of said particular system action.

19. The topic-interpreting method in accordance with claim 17 in which at least a first topic definition includes an action field for identifying a particular system action to be executed, said particular system action calling a related second topic definition, and said setting step includes the step of setting a control flag for initiating a command execution modification effective only in execution of said first topic definition and any additional topic definition called through an action of said first topic definition.

* * * * *